United States Patent
Bartlett et al.

(10) Patent No.: US 10,341,225 B2
(45) Date of Patent: Jul. 2, 2019

(54) BONDING OF SATELLITE TERMINALS

(71) Applicant: Hughes Network Systems, LLC, Germantown, MD (US)

(72) Inventors: Nigel Keith Bartlett, Del Mar, CA (US); Ronald Matthew Read, La Mesa, CA (US)

(73) Assignee: Hughes Network Systems, LLC, Germantown, MD (US)

( * ) Notice: Subject to any disclaimer, the term of this patent is extended or adjusted under 35 U.S.C. 154(b) by 128 days.

(21) Appl. No.: 15/399,383

(22) Filed: Jan. 5, 2017

(65) Prior Publication Data

US 2018/0191604 A1    Jul. 5, 2018

Related U.S. Application Data

(60) Provisional application No. 62/441,023, filed on Dec. 30, 2016.

(51) Int. Cl.
*H04L 12/707*    (2013.01)
*H04B 7/185*    (2006.01)

(52) U.S. Cl.
CPC ......... *H04L 45/24* (2013.01); *H04B 7/18513* (2013.01)

(58) Field of Classification Search
CPC ..... H04W 92/20; H04W 28/08; H04W 36/28; H04W 40/22; H04L 45/24; H04L 47/12;
(Continued)

(56) References Cited

U.S. PATENT DOCUMENTS

| | | | | |
|---|---|---|---|---|
| 5,920,701 A | * | 7/1999 | Miller | ................... H04L 1/1614 709/228 |
| 6,577,653 B1 | * | 6/2003 | Rochberger | ........ H04L 12/5601 370/536 |

(Continued)

FOREIGN PATENT DOCUMENTS

| | | |
|---|---|---|
| WO | WO 2012142042 | 10/2012 |
| WO | WO 2013171648 | 11/2013 |
| WO | WO 2016038611 | 3/2016 |

OTHER PUBLICATIONS

'4Gon.co.uk' [online]. "E-Lins H685 4G LTE Router," 4Gon Solutions, Apr. 2013, [retrieved on Feb. 16, 2017]. Retrieved from the Internet: URLhttp://www.4gon.co.uk/elins-b685-4g-lte-router-p-5690.html. 1 page.

(Continued)

*Primary Examiner* — Dung B Huynh
(74) *Attorney, Agent, or Firm* — Fish & Richardson P.C.

(57) ABSTRACT

Methods, systems, and apparatus, including computer programs encoded on a computer storage medium, for bonding of satellite terminals. In some implementations, a first satellite terminal with a first satellite communication link determines that it is in communication with a second satellite terminal that has a second satellite communication link. The first satellite terminal receives packet data from a data source and selects first packet data for transmission over the first satellite communication link and second packet data for transmission over the second satellite communication link. The first satellite terminal transmits the first packet data over the first satellite communication link, and provides the second packet data to the second satellite terminal for transmission over the second satellite communication link.

20 Claims, 4 Drawing Sheets

(58) Field of Classification Search
CPC .. H04L 63/18; H04B 7/18504; H04B 7/18513
See application file for complete search history.

(56) References Cited

U.S. PATENT DOCUMENTS

| | | | |
|---|---|---|---|
| 7,941,123 B2* | 5/2011 | Yang | H04L 67/104 370/230 |
| 7,948,933 B2 | 5/2011 | Ohayon | |
| 9,154,419 B2* | 10/2015 | Zhou | H04L 12/4633 |
| 9,686,335 B2* | 6/2017 | Dove | H04L 65/601 |
| 2001/0009547 A1* | 7/2001 | Jinzaki | H04L 12/40058 370/390 |
| 2002/0054578 A1* | 5/2002 | Zhang | H04L 1/0001 370/328 |
| 2003/0072269 A1* | 4/2003 | Teruhi | H04L 45/02 370/252 |
| 2004/0196798 A1* | 10/2004 | Abousleman | H04B 7/185 370/316 |
| 2007/0147234 A1* | 6/2007 | Walter | H04L 12/2856 370/229 |
| 2008/0130496 A1* | 6/2008 | Kuo | H04B 7/04 370/230.1 |
| 2009/0156177 A1* | 6/2009 | Aaron | H04W 4/02 455/414.1 |
| 2009/0253433 A1* | 10/2009 | Voyer | H04L 45/24 455/436 |
| 2010/0022186 A1 | 1/2010 | Walley | |
| 2011/0034175 A1* | 2/2011 | Fong | H04B 7/024 455/450 |
| 2011/0044236 A1* | 2/2011 | Giffin | H04B 7/18578 370/316 |
| 2011/0111776 A1* | 5/2011 | Kim | H04W 4/21 455/466 |
| 2011/0128956 A1* | 6/2011 | Yao | H04L 12/1886 370/390 |
| 2012/0004007 A1* | 1/2012 | Zhou | H04W 52/06 455/522 |
| 2012/0196579 A1* | 8/2012 | Souissi | H04L 25/14 455/414.4 |
| 2012/0243539 A1* | 9/2012 | Keesara | H04L 45/66 370/392 |
| 2013/0083754 A1* | 4/2013 | Chen | H04W 72/0406 370/329 |
| 2013/0136025 A1* | 5/2013 | Li | H04W 76/10 370/252 |
| 2013/0250881 A1* | 9/2013 | Liao | H04W 36/08 370/329 |
| 2013/0318257 A1* | 11/2013 | Lee | H04L 29/0854 709/248 |
| 2013/0322235 A1* | 12/2013 | Khoryaev | H04W 24/10 370/229 |
| 2014/0173055 A1* | 6/2014 | Yu | H04L 65/607 709/219 |
| 2014/0269553 A1 | 9/2014 | Stein et al. | |
| 2014/0341130 A1* | 11/2014 | Son | H04W 72/085 370/329 |
| 2014/0342748 A1* | 11/2014 | Zou | H04W 72/0426 455/452.1 |
| 2014/0355446 A1 | 12/2014 | Altman | |
| 2015/0036684 A1* | 2/2015 | Modi | H04L 45/22 370/389 |
| 2015/0244429 A1* | 8/2015 | Zhang | H04B 7/024 370/329 |
| 2016/0037511 A1* | 2/2016 | Vincze | H04B 7/024 370/329 |
| 2016/0057658 A1* | 2/2016 | Horn | H04L 43/16 370/236 |
| 2016/0119240 A1* | 4/2016 | Ross | H04L 47/22 370/235 |
| 2016/0198390 A1* | 7/2016 | Aminaka | H04W 16/32 370/328 |
| 2016/0233950 A1* | 8/2016 | Chuberre | H04B 7/18578 |
| 2017/0006586 A1* | 1/2017 | Gulati | H04W 72/0453 |
| 2017/0238234 A1* | 8/2017 | Dowlatkhah | H04W 8/005 455/517 |
| 2017/0279721 A1* | 9/2017 | Ross | H04L 47/12 |
| 2017/0332209 A1* | 11/2017 | Awai | G06F 13/00 |
| 2018/0035344 A1* | 2/2018 | Wang | H04W 36/08 |
| 2018/0054730 A1* | 2/2018 | Hong | H04W 8/24 |

OTHER PUBLICATIONS

'BGANsatellite.com' [online]. "Cobham Explorer 710 BGAN," BGAN Satellite, Apr. 2015, [retrieved on Feb. 16, 2017]. Retrieved from the Internet: URLhttp://www.bgansatellite.com/portable/cobham-explorer-710-bgan. 1 page.

'Greatarbor.com' [online]. "GAC-100 Dual WAN Link Bonding Router for Media and IPSec Data; Industry's First BGAN Bonding Solution," Great Arbor Communications, Apr. 2011, [retrieved on Feb. 16, 2017]. Retrieved from the Internet: URLhttp://www.greatarbor.com/gac100.html. 1 page.

'Inmarsat.com' [online]. "BGAN HDR; BGAN HDR (High Data Rate) supports a portfolio of four new streaming rates that look poised to set a new standard in live TV broadcasting," Inmarsat plc., Nov. 2013, [retrieved on Feb. 16, 2017]. Retrieved from the Internet: URLhttp://www.inmarsat.com/service/bgan-hdr/. 1 page.

'NsslGlobal.com' [online]. "NSSLGlobal and the BBC deliver live 'bonded HDR' satellite video broadcast," NSSL Global, Mar. 2015, [retrieved on Feb. 16, 2017]. Retrieved from the Internet: URLhttp://www.nsslglobal.com/index.php?idPage=2&n=22. 1 page.

'Wikipedia.com' [online]. "Broadband Global Area Network," Feb. 2017, [retrieved on Feb. 16, 2017]. Retrieved from the Internet: URLhtttps://en.wikipedia.org/wiki/Broadband_Global_Area_Network. 1 page.

'Wikipedia.com' [online]. "Channel bonding," Dec. 2016, [retrieved on Feb. 16, 2017]. Retrieved from the Internet: URLhttps://en.wikipedia.org/wiki/Channel_bonding>. 1 page.

'Wikipedia.com' [online]. "OSI model," Feb. 2017, [retrieved on Feb. 16, 2017]. Retrieved from the Internet: URLhttps://en.wikipedia.org/wiki/OSI_model. 1 page.

"AT Commands Reference Guide; 80000ST10025a Rev. 15," Telit Wireless Solutions, Oct. 2012, URLhttp://www.lte.com.tr/uploads/pdfe/1.pdf. 588 pages.

"RazorLink Acceleration, Bonding Resilience & Security," Livewire Digital Ltd., Sep. 2016, URLhttp://www.livewire.co.uk/downloads/RazorLinkSoftware.pdf. 2 pages.

"RazorLink Technology; Bonded Video Contribution," Livewire Digital Ltd., Apr. 2016, URLhttp://www.livewire.co.uk/products/razorlink.php. 2 pages.

"RazorLink Technology; Network Bonding," Livewire Digital Ltd., Apr. 2016, URLhttp://www.livewire.co.uk/products/razorlink.php. 1 page.

Waskowic, Peter, 'SatMagazine.com' [online]. "Now Is the Time for Single Channel to Multi-Channel Modulator Transition," SATCOM Products, Jun. 2016, [retrieved on Feb. 16, 2017]. Retrieved from the Internet: URLhttp://www.satmagazine.com/story.php?number=1558539335. 1 page.

Willems, Koen, "DVB-S2X Demystified," Newtec, Mar. 2014, 12 pages.

"BGAN Converge; Expanded Throughput for Existing Government Users," Inmarsat Government, URL>http://www.satcomsource.com/Inmarsat-BGAN-Converge-PDF.pdf >. 2 pages, Jan. 29, 2013.

\* cited by examiner

BONDING OF SATELLITE TERMINALS

CROSS-REFERENCE TO RELATED APPLICATIONS

This application claims the benefit under 35 U.S.C. § 119(e) of U.S. Patent Application No. 62/441,023, entitled "BONDING OF SATELLITE TERMINALS," filed Dec. 30, 2016. The disclosure of the foregoing application is incorporated herein by reference in its entirety for all purposes.

BACKGROUND

Satellite terminals can allow communication from many different locations. For example, broadband global area network (BGAN) terminals can allow data communications from locations all over the world. However, the bandwidth of a single satellite terminal is limited and may not be sufficient for some applications. Some systems have bonded multiple terminals or channels together to achieve greater throughput. However, these systems often require external devices to manage bonded connections, often at both sides of a link.

SUMMARY

In some implementations, a communication system bonds two or more satellite terminals together to increase overall throughput of the system. Bandwidth available from multiple bonded terminals may be aggregated and offered transparently as a single resource. To achieve the bonding of different terminals, software in one terminal automatically splits traffic, such as a video stream, across the various bonded terminals. Packets may retain their original source IP address, and the bonded terminal(s) act as packet relays forwarding the data across their respective satellite links. In this manner, the system can use two or more terminals to provide a communication channel that combines the available bandwidth of multiple independent satellite links.

The techniques described herein allow bonding of satellite terminals without requiring additional equipment for transmission and management. In other words, the processing system that enables bonding can be implemented within a satellite terminal, without requiring external equipment other than the terminals to be bonded. For example, appropriate hardware interfaces and software to enable bonding can be integrated into a satellite terminal, allowing the satellite terminal to establish bonding and handle management of data transfer.

One of the advantages of the bonding techniques discussed below is the ability to use standard devices and infrastructure. Only one satellite terminal, designated as the primary terminal, uses bonding software to fulfill a management role. Other bonded satellite terminals, referred to as secondary terminals, and are not required to have any awareness of the bonding, so bonding can be transparent to these terminals. For example, the secondary terminals can be standard terminals operating in a standard mode, with no need for modification to participate in the bonded communication link.

Also, the bonding is transparent to the data source device, such as a video camera. The primary terminal presents the user device a communication channel with an apparent bandwidth representing the combined bandwidth of multiple terminals. The user device may then provide all data to be transmitted over the channel to the primary terminal. In this manner, the bonding arrangement can work with any user device with a single interface. There is no need for the user device to include multiple interfaces to communicate with the secondary terminals, because the primary terminal forwards the data to the secondary terminals with its own interfaces. Further, there is no need for any intermediate device to be connected between the user device and the primary terminal for routing or management of data transfer. In addition, the bonding arrangement operates without any changes to the satellite gateway or other back-end systems.

These features allow bonding to be transparent to the user device that is uploading data. The bonding is also transparent to the receiver, the satellite gateway, and any infrastructure carrying the data. Other systems that have performed bonding have not had this ability. For example, may systems have required user devices to set up and manage bonding. Some systems have required a user device, such as a video camera or laptop computer, to split data traffic among different terminals using specialized software. These prior systems have sometimes required a user device to have specific hardware requirements, such as multiple interfaces in order to concurrently communicate with multiple terminals. Other systems have required additional components to enable bonding, such as routers or other external devices, and some have required changes to gateways or other infrastructure for data streams to be properly received.

Because the techniques described herein allow bonding to be transparent to a user device, they can be used with any user device able to connect to a single satellite terminal. Similarly, bonding can be used with standard receivers and network infrastructure. No awareness of the bonding is needed by a satellite gateway or receiver, even when return traffic is provided to the user device.

In one general aspect, the techniques disclosed herein describe methods of bonding satellite terminals. According to some of the methods, a first satellite terminal that has a first satellite communication link determines that it is in communication with a second satellite terminal that has a second satellite communication link. In operation, the first satellite terminal receives packet data from a data source. In response to determining that the first satellite terminal is in communication with the second satellite terminal, the first satellite terminal selects, from among the packet data, (i) first packet data for transmission over the first satellite communication link and (ii) second packet data for transmission over the second satellite communication link. The first satellite terminal transmits the first packet data over the first satellite communication link, and provides the second packet data to the second satellite terminal for transmission over the second satellite communication link.

Other embodiments include corresponding systems, apparatus, and software programs, configured to perform the actions of the methods, encoded on computer storage devices. For example, some embodiments include a satellite terminal configured to perform the actions of the methods. A device or system of devices can be so configured by virtue of software, firmware, hardware, or a combination of them installed so that in operation cause the system to perform the actions. One or more software programs can be so configured by virtue of having instructions that, when executed by data processing apparatus, cause the apparatus to perform the actions.

Implementations may include one or more of the following features. For example, in some implementations, transmitting the first packet data over the first satellite communication link by the first satellite terminal occurs while the second satellite terminal concurrently transmits the second packet data over the second satellite communication link.

In some implementations, the first satellite terminal is configured to perform bonding with the second satellite terminal in a manner that is transparent to the data source.

In some implementations, the method includes determining, by the first satellite terminal, a transmission bandwidth of the first satellite communication link of the first satellite terminal; and determining, by the first satellite terminal, a transmission bandwidth of the second satellite communication link of the second satellite terminal. Selecting the first packet data and the second packet data includes selecting the packet data based on the transmission bandwidth of the first satellite communication link and the transmission bandwidth of the second communication link.

In some implementations, the transmission bandwidth of the first satellite communication link is different from the transmission bandwidth of the second satellite communication link. Selecting the first packet data and the second packet data includes dividing the packet data proportionally according to the transmission bandwidth of the first satellite communication link and the transmission bandwidth of the second satellite communication link.

In some implementations, determining the transmission bandwidth of the second satellite communication includes: receiving, by the first satellite terminal from the second satellite terminal, information indicating a current status of the second satellite communication link between the second satellite terminal and a satellite gateway.

In some implementations, the method includes determining, by the first satellite terminal, a combined bandwidth based on the transmission bandwidth of the first satellite terminal and the second satellite terminal; and providing, by the first satellite terminal, data indicating the combined bandwidth to the data source.

In some implementations, the data source includes a video camera providing a video stream that exceeds a transmission bandwidth of the first satellite communication link but is less than or equal to the combined bandwidth of the first satellite communication link and the second satellite communication link. Selecting the first packet data and the second packet data includes selecting first packets of the video stream as the first packet data and selecting second packets of the video stream as the second packet data.

In some implementations, receiving the packet data includes receiving the packets of the video stream over a direct connection from the video camera to the first satellite terminal. Providing the second packet data to the second satellite terminal includes routing, by the first satellite terminal, the second packets of the video stream to the second satellite terminal.

In some implementations, the method includes providing, by the first satellite terminal to the data source, data indicating an available bandwidth for transmission that exceeds a transmission bandwidth of the first satellite communication link.

In some implementations, the method includes communicating, by the first satellite terminal with the data source, such that return data packets from a receiver that receives the packet data are routed through the first satellite communication link and not through the second satellite communication link.

In some implementations, receiving the packet data includes receiving a data stream. The method can further include: determining a change in a status of the first satellite communication link or the second satellite communication link; and based on determining the change in the status of the first satellite communication link or the second satellite communication link, changing an allocation of packets in the data stream to alter a proportion of the data stream that is provided over the first satellite communication link and the second satellite communication link.

In some implementations, the method includes: determining, by the first satellite terminal, that the first satellite terminal is in communication with one or more additional satellite terminals that each have a respective satellite communication link; in response to determining that the first satellite terminal is in communication with the one or more additional satellite terminals, selecting, by the first satellite terminal, respective additional packet data for transmission over the respective satellite communication links of the one or more additional satellite terminals; and providing, by the first satellite terminal, the respective additional packet data to the one or more additional satellite terminals. Transmitting the first packet data over the first satellite communication link by the first satellite terminal occurs concurrently with (i) transmission of the second packet data over the second satellite communication link by the second satellite terminal and (ii) transmission of the respective additional packet data over the respective satellite communication links of the one or more additional satellite terminals.

In some implementations, providing the data includes: altering, by the first satellite terminal, link layer headers of packets in the second packet data to generate packets with modified link layer headers in which an original destination address for the first satellite terminal is replaced with a destination address for the second satellite terminal; and transmitting, by the first satellite terminal, the packets with the modified link layer headers to the second satellite terminal.

In another general aspect, a system includes: a user device that provides packet data; a first satellite terminal having a first satellite communication link; and a second satellite terminal having a second satellite communication link separate from the first satellite communication link. The first satellite terminal is configured to provide, to the user device, a transmission bandwidth of the first satellite communication link and the second satellite communication link as a single communication resource. The first satellite terminal is configured to receive the packet data from the user device and route the packet data such that the first satellite terminal transmits a first subset of the packet data over the first satellite communication link and the second satellite terminal transmits a second subset of the packet data over the second satellite communication link.

Implementations can include one or more of the following features. For example, in some implementations, the system is configured so that bonding of the first satellite terminal and the second satellite terminal is transparent to the user device.

In some implementations, the system includes one or more additional satellite terminals each having a respective satellite communication link. The first satellite terminal is configured to route one or more additional subsets of the packet data for transmission one or more additional satellite terminals such that the third packet data is transmitted over the respective satellite communication links currently with transmission of the first subset of the packet data over the first satellite communication link and transmission of the second subset of the packet data over the second satellite communication link.

In some implementations, the second satellite terminal is configured to provide, to the first satellite terminal, bandwidth data indicating transmission bandwidth available on the second communication link. The first terminal is configured to determine, based on the bandwidth data from the second satellite terminal, a combined transmission bandwidth representing transmission bandwidth using both the first satellite communication link and the second communication link. The first terminal is configured to provide data indicating the combined transmission bandwidth to the user device.

In some implementations, the user device is configured to provide, to the first satellite communication terminal, packets of a video stream as the packet data. The user device is configured to adjust an encoding of the video stream based on the combined transmission bandwidth indicated by the first satellite communication link.

In some implementations, the first satellite terminal is configured to determine changes in the combined transmission bandwidth and provide data indicating an updated combined transmission bandwidth to the user device while the video stream is being transmitted over the first satellite communication link and the second satellite communication link. The user device is configured to dynamically adjust the encoding of the video stream in response to receiving the data indicating the updated combined transmission bandwidth.

In some implementations, the first satellite terminal is configured to route the packet data proportionally according to an available transmission bandwidth of the first satellite communication link and an available transmission bandwidth of the second satellite communication link.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
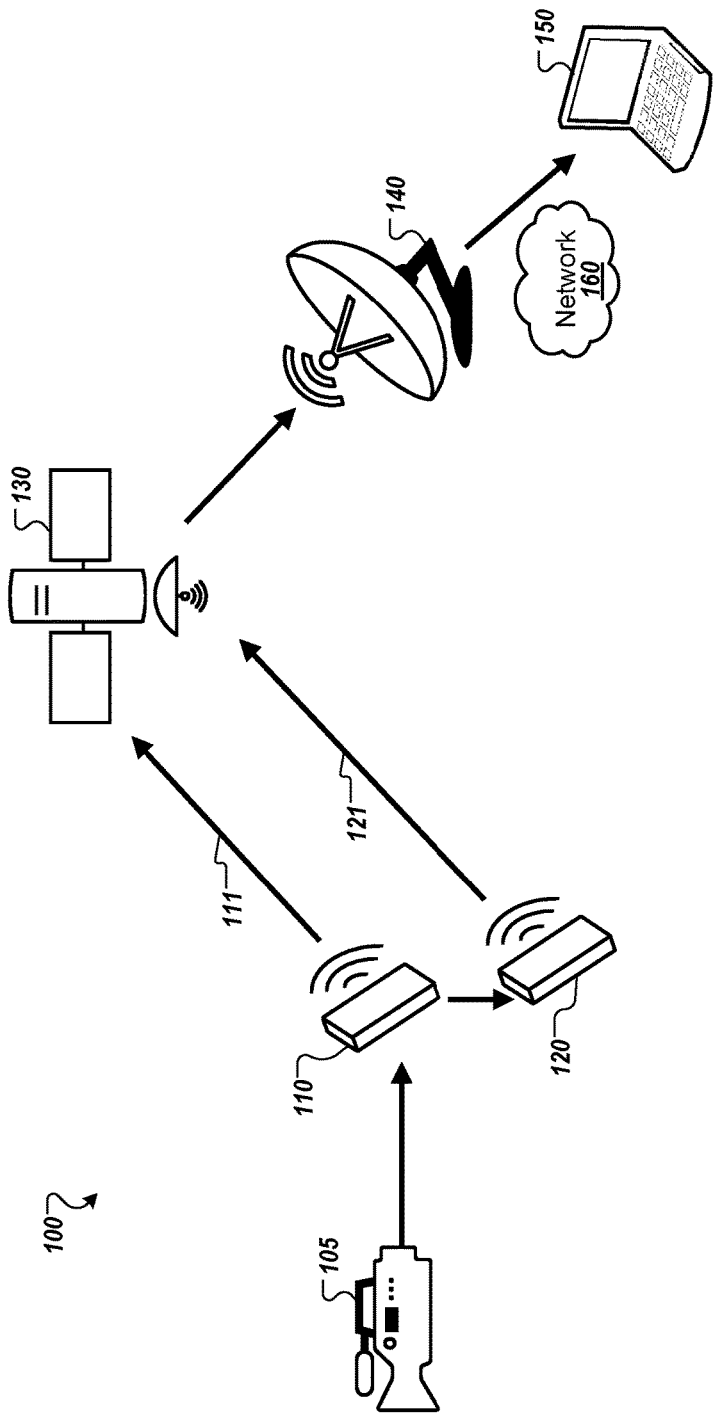
FIG. 1 is a diagram that illustrates an example of a system for bonding satellite terminals.

FIG. 1 illustrates an example of a system 100 for bonding of satellite terminals. The system 100 includes a user device 105, satellite terminals 110, 120, one or more satellites 130 of a satellite network, one or more satellite gateways 140, a receiver 150 and a network 160. The example of FIG. 1 shows how multiple satellite terminals 110, 120 can be bonded to provide the user device 105 a single uplink communication channel that exceeds the bandwidth available to either satellite terminal 110, 120 individually. As illustrated, the user device 105 communicates with a single satellite terminal 110, and bonding is transparent to the user device 105. Similarly, bonding is transparent to the one or more satellite gateways 140 and the receiver 150, which operate in their standard manner without any knowledge that bonding is taking place.

In general, satellite terminals each have separate radios and antennas, and thus each have a separate link to a satellite network. Each satellite link may have a certain amount of bandwidth available for transmission, e.g., 0.25 Mbit/s, 0.5 Mbit/s, and so on. Bonding can combine the available bandwidth of multiple satellite terminals to form a single logical communication channel. For example, two separate satellite terminals that each have a 0.5 Mbit/s uplink capability may be bonded to provide a 1.0 Mbit/s uplink channel. Similarly, three terminals could be bonded to create a 1.5 Mbit/s uplink channel, and so on.

As discussed further below, the functionality to implement bonding can be integrated within a single, primary satellite terminal. The primary terminal can coordinate data transfer with secondary terminals, which can be standard terminals that are not required to be aware of the bonding arrangement. The primary terminal uses the bandwidth of multiple terminals to transparently emulate a single communication channel with the combined bandwidth. The operation of the primary terminal to distribute data among various terminals can be hidden from the user device providing the data being transmitted. As a result, to benefit from the combined bandwidth, the user device needs only a single communication interface to provide data to the primary terminal. The user device need not connect to the secondary terminals or designate any data for transmission by the secondary terminals. The user device can connect directly to the satellite terminal, with no router or other intermediate device needed. The techniques can also be implemented without changes to a satellite gateway or other network infrastructure. Data packets sent by the primary terminal and the secondary terminals can also be processed in the standard manner, even though the original data stream from the user device has been divided among various satellite links.

Referring to FIG. 1, the system 100 includes user device 105, which is a video camera in the illustrated example. More generally, a user device 105 may be a video camera, a computer, or other data source that provides data for transmission through the satellite network. The user device 105 communicates with a primary terminal 110, for example, by providing packets of a video stream through a wired or wireless connection. As another example, the data stream may represent a large file transfer from a computer. The data stream provided by the user device 105 may exceed the available transmission bandwidth of the primary terminal 110. However, by bonding the primary terminal 110 with one or more other satellite terminals, the primary terminal 110 provides the user device 105 a channel that has higher bandwidth than any of the individual terminals can provide.

In the example, the primary terminal 110 receives the video stream that the user device 105 provides, and the primary terminal 110 transmits some packets from the video stream through its own satellite communication link 111. The primary terminal 110 routes other packets of the video stream to a secondary terminal 120 for transmission through the satellite communication link 121.

In typical data traffic, there are headers for different network layers. Transport layer headers, e.g., Internet Protocol (IP) headers, need not be changed. Thus, the headers used for IP addressing and routing can be preserved. However, headers used for local link addressing and routing, e.g., media access control (MAC) layer headers, can be modified to facilitate the routing of data for bonding. To route packets to the secondary terminal, the primary terminal alters the link layer headers or MAC layer headers to specify the MAC address of the secondary terminal as the destination, instead of the MAC address for the primary terminal. The link layer header is used to specify the single hop between bonded terminals, not Internet addressing or routing. The MAC layer headers are stripped off before transmission over the satellite network, leaving the original IP or transport layer packets intact when sent by the primary or secondary terminals.

For example, the primary terminal 110 may modify the link layer headers for some packets of the video stream to replace its MAC address with the MAC address of the secondary terminal as the destination address. The primary terminal 110 may then forward the modified packets to the secondary terminal 120, which transmits those packets over the satellite link 121. The secondary terminal 120 acts in a standard manner, simply processing the packets that are sent to it. The secondary terminal 120 receives packets from the primary terminal 110, but is not required to have information about or communication with the user device 105 or any other secondary devices that may also be used to transmit the video stream.

The packets transmitted by the satellite terminals 110, 120 are transmitted by one or more satellites 130 to one or more satellite gateways 140. The packets may then be provided to the intended receiver 150 over a network 160, such as the Internet. Because the packets are sent through different satellite links 111, 121, the receiver 150 may receive the packets out of order. The receiver 150 then re-orders the packets to reconstruct the video stream. Many transmission protocols, including transfers of user datagram protocol (UDP) packets over the Internet, do not guarantee the arrival sequence of packets. Accordingly, the receiver 150 can implement techniques to reconstruct the sequence, for example, while buffering the data stream an appropriate amount of time.

Figure 2:
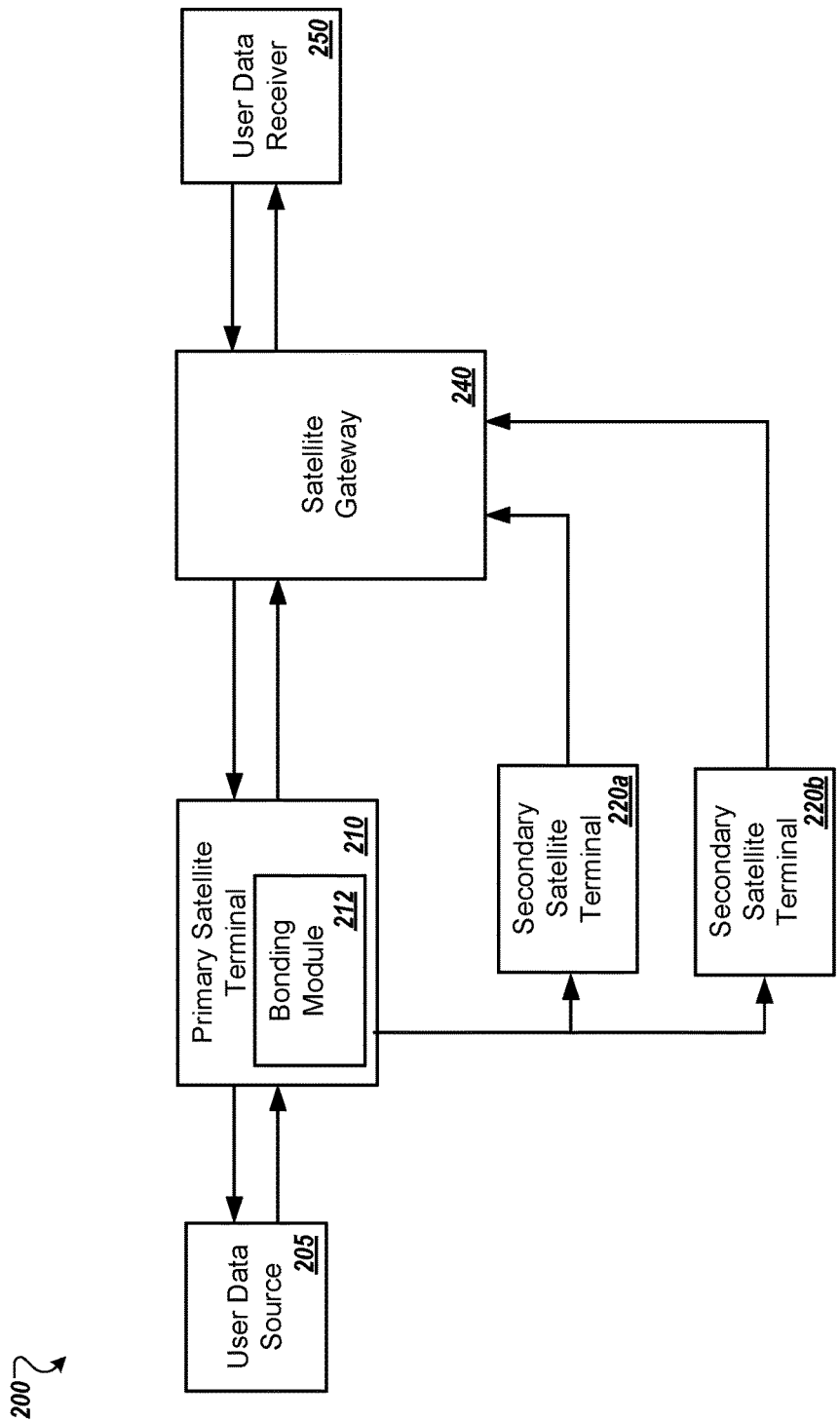
FIGS. 2 and 3 are block diagrams that illustrate examples of systems for bonding satellite terminals.

FIG. 2 illustrates an example of a system 200 for bonding of satellite terminals. The system includes a user data source 205, which may be a device such as a video camera, a laptop computer, a desktop computer, a tablet computer, a phone, and so on. The system 200 also includes a primary satellite terminal 210 that receives a user data stream from the user data source 205. The primary satellite terminal 210 transmits some packets of the user data stream over a satellite communication link to a satellite gateway 240. The primary satellite terminal 210 transmits other packets of the user data stream to secondary satellite terminals 220a, 220b, so that their separate satellite communication links are used to increase the overall throughput for the user data source 205. The satellite gateway 240 provides the packets to the user data receiver 250.

In the example of FIG. 2, bonding is performed transparently so that the user data source 205 need not be aware that data traffic is being split among multiple terminals. The user data source 205 communicates directly with the primary satellite terminal 210 and does not need to interface with the secondary satellite terminals 220a, 220b. Accordingly, the user data source 205 can be a standard device operating in a standard manner, and the primary satellite terminal 210 manages bonding in a manner that is transparent to the user data source 205.

The primary satellite terminal 210 includes a bonding module 212 that manages bonded communication. The bonding module 212 can be implemented in software, firmware, hardware, or a combination thereof. The bonding module 212 performs various operations to establish and maintain connections for the bonded communication mode. For example, the bonding module 212 can discover secondary terminals 220a, 220b, route packets among the terminals 210, 220a, 220b, monitor the bandwidth availability and status of the terminals 210, 220a, 220b, and so on.

The primary satellite terminal 210 communicates with the user data source 205 over any appropriate data connection, e.g., Ethernet, Wi-Fi, Bluetooth, Universal Serial Bus (USB), and so on.

In some implementations, each of the terminals 210, 220a, 220b are Inmarsat BGAN terminals. Each terminal 210, 220a, 220b can be a separate, self-contained communication system, with its own radio and antenna for independently establishing a satellite communication link independent of the other terminals in the system 200. The primary satellite terminal 210 can communicate with the secondary terminals 220a, 220b through a wired connection, a wireless connection, or a combination. For example, the primary satellite terminal 210 and the secondary terminals 220a, 220b can communicate over any appropriate data connection, e.g., Ethernet, Wi-Fi, Bluetooth, Universal Serial Bus (USB), and so on. In some implementations, the primary satellite terminal 210 is directly connected to the secondary terminals 220a, 220b. In other implementations, the primary satellite terminal 210 may be indirectly connected to the secondary terminals 220a, 220b, e.g., through a local network.

In some implementations, the primary satellite terminal 210 can communicate with each secondary satellite terminal 220a, 220b with a separate interface, for example, using a different Ethernet port to connect to each of the secondary satellite terminals 220a, 220b, or using a wired connection to one terminal and a wireless connection to the other terminal. In some instances the number of available interfaces on the primary satellite terminal 210 may be less than the number of secondary satellite terminals 220a, 220b to be bonded. Accordingly, the primary satellite terminal 210 may provide information to one secondary terminal to be forwarded on to other secondary terminals. For example, the terminals may be chained together and configured to forward packets to the appropriate terminal. If the primary satellite terminal 210 had only two communications interfaces, for example, one interface could be used to connect to the user data source 205 and the other interface could be used to connect to the secondary satellite terminal 220a. The secondary satellite terminal 220a could then connect to the other secondary satellite terminal 220b and forward packets designated for the secondary satellite terminal 220b.

The illustrated lines between elements of the system 200 are drawn to represent the flow of user data packets between the user data source 205 and the user data receiver 250. The elements of the system 220 may communicate other information beyond what is illustrated by the lines and arrows. For example, the connection between the terminals 210, 220a, 220b is illustrated with an arrow in one direction, from the primary satellite terminal 210 to the secondary terminals 220a, 220b, to represent the flow of data packets from the user data source 205. However, the primary terminal and the secondary terminals 220a, 220b are generally connected with two-way communication links. The secondary terminals 220a, 220b can provide various information to the primary satellite terminal 210, including data indicating available bandwidth of each terminal, load and capacity information, signal strength and quality of service data, and other status information. Similarly, although the secondary satellite terminals 220a, 220b do not receive return data packets sent from the user data receiver 250, the secondary satellite terminals 220a, 220b may receive other data from the satellite gateway 240.

In the example of FIG. 2, to initiate bonded communication, the primary satellite terminal 210 detects that a connection is available or has been established with the secondary satellite terminals 220a, 220b. The discovery and assignment of terminals as secondary satellite terminals 220a, 220b may be automated. For example, the primary satellite terminal 210 may request and receive information indicating the capabilities or device type of the connected terminal, and use the information to determine whether to initiate bonding. In some implementations, the primary satellite terminal 210 may perform a negotiation process to determine whether the secondary satellite terminals 220a, 220b accept the role of secondary satellite terminals. In this process, the primary satellite terminal 210 may acquire a variety of information about the secondary satellite terminals 220a, 220b, such as their MAC addresses, the status of their satellite communication links, and so on. If determined to be appropriate, the primary satellite terminal 210 can request that one or more terminals enter a bonding mode to begin operation as secondary terminals. In addition, or as an alternative, a user may manually configure multiple terminals to enter a bonding arrangement, for example, by providing user input to the various terminals that designates one terminal as a primary terminal and designates one or more other terminals as secondary terminals.

With communication established between the primary satellite terminal 210 and the secondary terminals 220a, 220b, the primary satellite terminal 210 determines the available bandwidth that each terminal 210, 220a, 220b can contribute for transmission of the data stream from the user data source 205. In some instances, the terminals 210, 220a, 220b may have different capabilities. For example, one terminal may be capable of transmitting at 0.5 Mbit/s, while another may only be capable of transmitting at 0.25 Mbit/s. The primary satellite terminal 210 may determine a number of different bandwidth measures. For example, a maximum bandwidth of a terminal can be determined. As another example, a currently available bandwidth may be determined based on current satellite link conditions and/or other data traffic being sent by the terminal. As another example, a bandwidth measure may indicate a guaranteed minimum available bandwidth, a bandwidth estimated based on a device type or model of a terminal, an average bandwidth over a period, or a bandwidth value input by user.

The primary satellite terminal 210 may obtain a variety of network information from the secondary terminals 220a, 220b. For example, the primary satellite terminal 210 may receive, in addition to information about available transmission bandwidth, information about signal strength of a satellite communication link, quality of service information (e.g., indicating packet losses, errors, etc.) for a terminal's satellite communication link, other concurrent connections of the terminal, and so on. This information may be provided by the secondary terminals 220a, 220b in response to a request from the primary satellite terminal 210, or may be periodically provided by the secondary terminals 220a, 220b without a request. The available bandwidth of each terminal 210, 220a, 220b and communication link status may vary during the course of data transmission, e.g., due to interference or the need to transfer other data. As a result, the primary satellite terminal 210 may monitor this information while in the bonding arrangement and adjust how traffic is allocated among the terminals 210, 220a, 220b based on changes detected.

With a measure of transmission bandwidth determined for each terminal 210a, 220a, 220b, the primary satellite terminal 210 can determine a combined bandwidth for the bonded terminals. Generally, this combined available bandwidth can be determined as the sum of the individual transmission bandwidths available for the various bonded terminals 210, 220a, 220b. In some implementations, the primary satellite terminal 210 may reduce this sum to take into account overhead, other data to be transferred, or to provide a margin for fluctuations. The primary satellite terminal 210 may use any of the current or historical network information obtained to determine the combined bandwidth of the bonding arrangement.

The primary satellite terminal 210 can provide data indicating the combined bandwidth to the user data source 205. The primary terminal may also optionally display or otherwise output the information to a user. The user data source 205 may use the information to adjust the output of its data stream. For example, a video camera can use the bandwidth information to set a bit rate for encoding a video stream being transmitted. As conditions change, the primary satellite terminal 210 recalculates the combined bandwidth available and provides the updated information to the user data source 205. The video camera can adjust the encoding of a video stream accordingly, for example to increase the data rate for higher quality video in response to an increase in available bandwidth, or to decrease the data rate in response to a decrease in available bandwidth. Thus, the user data source 205 can dynamically adjust the data stream provided for transmission according to the information provided by the primary satellite terminal 210.

In the example of FIG. 2, the user data source 205 provides a data stream to the primary satellite terminal 210. To the user data source 205, the bonding can be transparent so that the full combined bandwidth is provided through a single connection or interface with the primary satellite terminal 210. As noted above, the primary satellite terminal 210 represents itself as providing the combined available bandwidth of the bonded terminals 210, 220a, 220b. The primary satellite terminal 210 also accepts all data for the data stream from the user source device 205. For example, the data stream may not be provided to any of the secondary terminals 220a, 220b except as packets are forwarded by the primary satellite terminal 210. Information about individual bonded terminals and their respective satellite links need not be provided to the user data source 205, although it could be provided if desired. Because the primary satellite terminal 210 handles all of the packet routing and management to enable the bonding, neither the user data source 205 nor any other device need manage the allocation of traffic among the terminals 210, 220a, 220b.

In some implementations, the primary satellite terminal 210 provides the bonded communication channel to a single device, so that the data stream represents a data transfer of a single device. The data stream may be a series of packets, such as UDP packets. In some instances, the packets are part of a single transfer, e.g., packets of a single video stream.

When the user data source 205 provides packets to be transmitted, the bonding module 212 of the primary satellite terminal 210 allocates the packets among the terminals 210, 220a, 220b. For example, the bonding module 212 divides the user data and routes some user data packets directly to the satellite gateway 240. The bonding module 212 routes the rest of the user data packets to the secondary terminals 220a, 220b, for transmission over their respective links to the satellite gateway 240. When distributing the packets among the terminals 210, 220a, 220b, the source IP address of the user data is unchanged. In some implementations, to route packets to a target secondary terminal, the bonding module 212 simply changes the destination MAC address of the packets to the target secondary satellite terminal. For example, the MAC address of the primary satellite terminal 210, indicated as the destination address in a link layer header for an original packet, can be replaced with the MAC address for the particular secondary satellite terminal assigned to transmit the packet. The underlying IP packet from the user data source 205 is unchanged, and the link layer/MAC layer header is stripped before the packet is sent over the satellite link. The change in the link layer header simply achieves the routing of the packet to the appropriate secondary terminal 220a, 220b. As the various packets are assigned and the destination MAC addresses are updated in the link layer headers, the primary satellite terminal 210 provides the packets with modified link layer headers to the secondary satellite terminals 220a, 220b.

The primary satellite terminal 210 can assign the packets of a data stream in any of a variety of ways. For example, the primary satellite terminal 210 can alternate among the terminals 210, 220a, 220b so that a first packet in a sequence is assigned to terminal 210, the second packet to terminal 220a, the third packet to terminal 220b, the fourth packet to terminal 210, and so on. As another example, the primary satellite terminal 210 may assign packets by assigning a group of 10 packets to terminal 210, assigning the next 10 packets to terminal 220a, and so on.

In some implementations, the primary satellite terminal 210 uses network feedback to vary how the traffic assigned. In some bonding configurations, the terminals 210, 220a, 220b may have equal throughput, and so the data stream may be divided so that each terminal 210, 220a, 220b transmits a substantially equal portion of the data stream. However, in other instances, each terminal 210, 220a, 220b may have a different throughput, due to differences in their designs or to temporary conditions such as interference. Accordingly, the primary satellite terminal 210 may assign the packets in proportion to the available bandwidth of the terminals 210, 220a, 220b. As a simple example, the primary satellite terminal 210 may have an available bandwidth of 0.4 Mbit/s, while each of the secondary terminals 220a, 220b has an available bandwidth of 0.3 Mbit/s. In this case, for every 100 packets of the data stream, the primary satellite terminal 210 may assign 40 of the packets for itself to transmit, and designate two sets of 30 packets for each of the secondary terminals 220a, 220b. As the bandwidth of the terminals 210, 220a, 220b changes, the primary satellite terminal 210 may dynamically adjust how the data stream is divided, in order to adapt to the changing conditions and maintain a proportional the proportion of traffic Other techniques may also be used to divide the packets of a data stream. For example, the primary satellite terminal 210 may prioritize traffic for transmission over the satellite links that have the highest signal quality, e.g., signal strength or quality of service. For example, the bonding module 212 may first assign packets to be transferred by the terminal that currently has the highest-quality satellite link, up to the maximum capacity of that link. The remainder of the packets may be assigned to be transmitted by the other terminals, filling up the capacity of each terminal in order of decreasing link quality. In some implementations, a differentiated services code point (DSCP) in the IP header may be used to route packets among the multiple terminals.

After the bonding module 212 assigns the packets in the data stream, the terminals 210, 220a, 220b each send their assigned packets to the satellite gateway 240 over their respective satellite communication links. The content of the data packets has not changed, and the link layer/MAC layer headers that the bonding module 212 modified are stripped off before transmission to the satellite gateway 240. As a result, the satellite gateway 240 can process the packets in the standard manner, and no changes are needed to support the bonding. The satellite gateway 240 provides the packets to the user data receiver 250, which may occur over a network such as the Internet.

Because the packets of the data stream from the user data source 205 have been transferred over different communication links, there is potential for the packets to be received out of order at the user data receiver 250. The user data receiver 250 may re-order the packets to re-construct the data stream. Since traffic over the Internet is not guaranteed to arrive in sequence, this reconstruction can be handled by the user data receiver 250 using standard techniques. For example, a video encoding technique used to generate the data stream may indicate a proper sequence for the packets. Similarly, data transferred as part of a file upload may indicate a proper sequence for transmitted packets.

The user data receiver 250 can also provide return traffic to the user data source 205. For example, the user data receiver 250 may provide commands or acknowledgements. As another example, when live broadcast video is sent through the bonded connection, a return voice path may be used to communicate with the journalist at the user data source 205. With the bonding technique of FIG. 2, all return traffic to the user data source 205 is routed through the satellite link of the primary satellite terminal 210. Because the bonding does not change the content of the original packets of the data stream (e.g., only the link layer headers that are stripped before transmission are modified), the packet data that reaches the satellite gateway 240 and user data receiver 250 all indicate that the source was the user data source 205, through the primary satellite terminal 210. Return traffic to the user data source 205 is naturally restricted to this particular link, since none of the packets to the user data receiver 250 identify the secondary terminals 220a, 220b. This is advantageous to make use of standard gateway functionality. Further, in many applications, a single satellite link is more than adequate for return traffic. For example, sending voice data on the return channel is likely to be only a small portion of the available downlink bandwidth for the primary satellite terminal 210.

In general, the system 200 can be designed to provide tolerance for out-of-order packet delivery. For example, since data from the data stream is split among different communication links, the data may arrive out of order and with some delays. The receiver can include a buffer to store data as well as software to re-order received data into the proper sequence. If a packet is not received for more than a predetermined amount of time, the receiver can declare a packet lost, then handle its loss, e.g., by requesting retransmission, interpolating video data, etc. The timeout periods used for designating a packet lost may vary based on the application, communication link characteristics, and other factors.

In some implementations, network address translation (NAT) is performed outside the scope of the bonded terminals. In other implementations, the bonded terminals together act as an aggregated NAT device.

Figure 3:
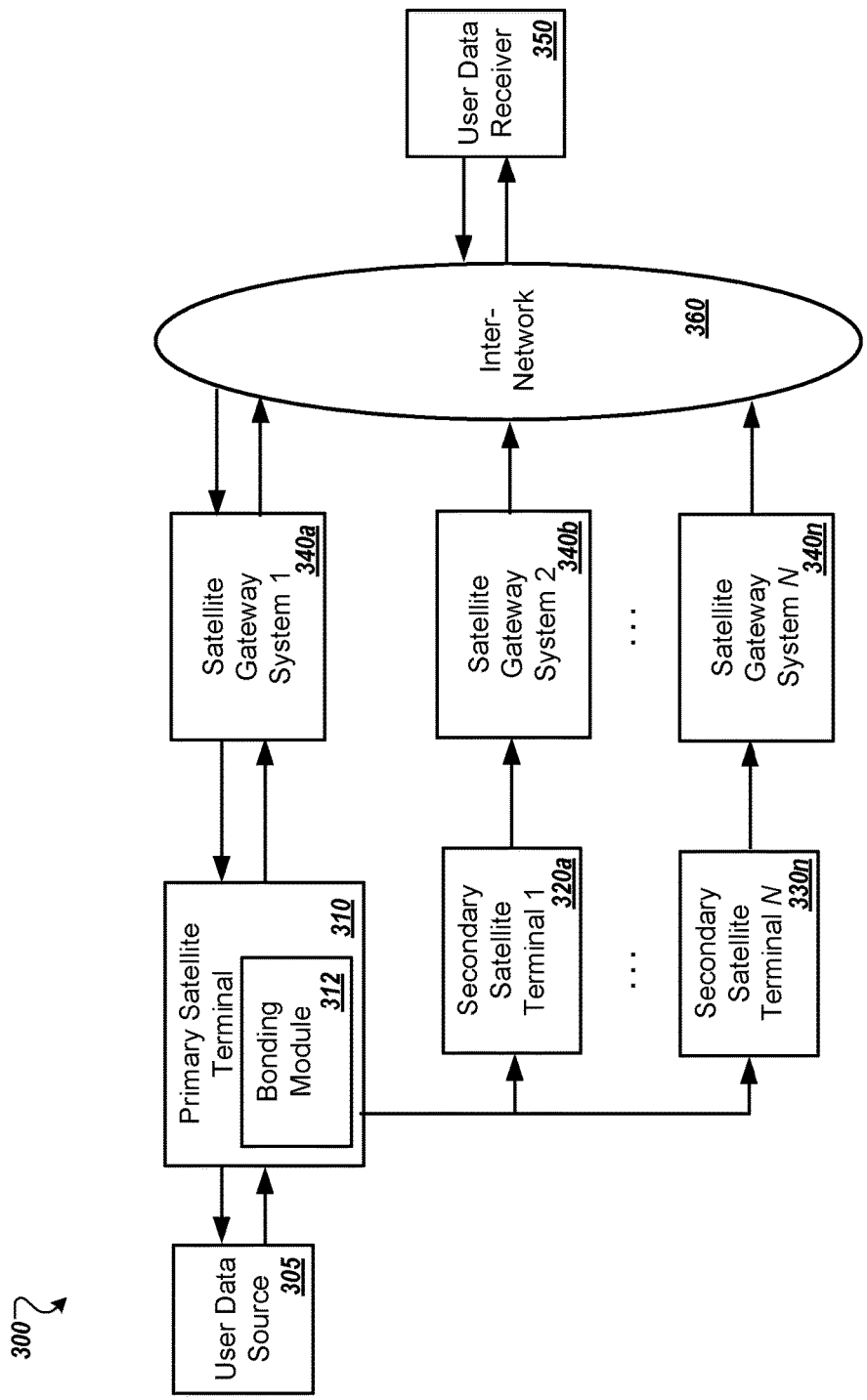

FIG. 3 is another example of a system 300 for bonding satellite terminals. Similar to the system 200 of FIG. 2, the system 300 includes a user data source 305 that provides a data stream to a primary satellite terminal 310. The primary satellite terminal 310 includes a bonding module 312 that manages bonding with one or more secondary satellite terminals 320a-320n to increase the effective throughput for the user data source 305.

The elements of FIG. 3 can operate in the same manner that the corresponding elements are described for FIG. 2. In addition, FIG. 3 shows that the primary satellite terminal 310 may bond a large number or variable number of secondary terminals 320a-320n, represented by an integer N number of secondary terminals. In addition, the secondary terminals 320a-320n do not necessarily communicate with the same satellite gateway as the primary satellite terminal 310 or each other. As illustrated, the terminals 310, 320a-320n may each optionally communicate with a different satellite gateway system 340a-340n. Indeed, because the primary satellite terminal 310 performs all of the routing functions needed for bonding, the secondary satellite terminals 320a-320n may be terminals from different manufacturers, or terminals that operate using different satellite networks.

In some implementations, the primary satellite terminal 310 can be used to perform bonding across different types of communication channels. For example, the primary satellite terminal 310 may route a portion of traffic from the user data source 305 to a device with a communication link over a cellular network or other type of network, in addition to or instead of bonding communications links for satellite networks.

In general, the bonding of communications terminals discussed above can be performed with any of various types of network connections, and is not limited to satellite communications terminals. For example, wired or wireless communications links such as cellular connections, cable modems, microwave links, and so on may be used as communications links for a primary terminal, a secondary terminal or both, in addition to or instead of using satellite communication links. For example, a terminal for a cellular network and a terminal for a satellite network may be bonded together, and traffic may be dynamically split or shifted from one to the other depending on which connection has better reliability and bandwidth.

Figure 4:
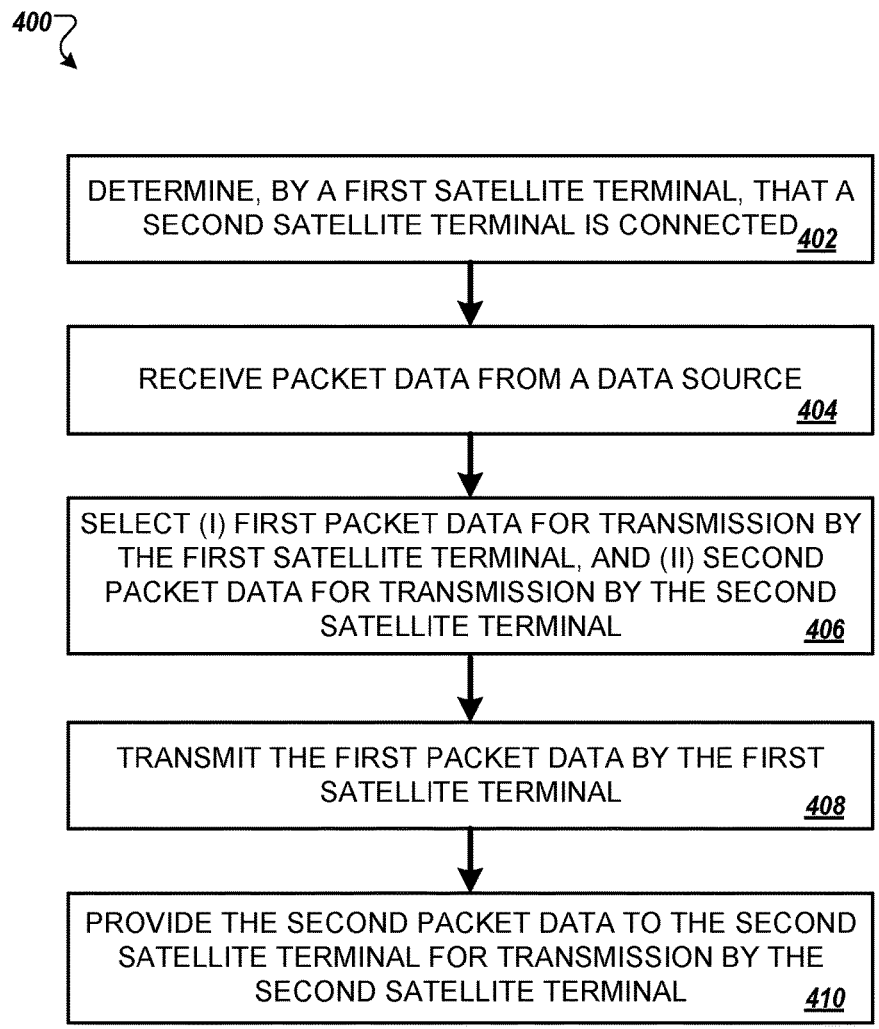
FIG. 4 is a flow diagram that illustrates a process for bonding satellite terminals.

FIG. 4 illustrates an example of a process 400 for bonding satellite terminals. The process 400 may be performed by a satellite terminal, such as any of the primary satellite terminals 110, 210, or 310 discussed above. The satellite terminal may include one or more processors. The satellite terminal may also include one or more data storage devices storing instructions that, when executed, cause the satellite terminal to perform the actions of the process 400. The steps of the process 400 may be performed in the order shown in FIG. 4, or in another order.

In step (402), a first satellite terminal, which has a first satellite communication link, determines that the first satellite terminal is in communication with a second satellite terminal that has a second satellite communication link. For example, the first satellite terminal may determine that a wired or wireless connection exists with the second satellite terminal. The first satellite terminal may communicate with the second satellite terminal to determine the capabilities of the second communication terminal and the status of its satellite communication link. The first satellite terminal may also obtain information about the second communication link, such as the available bandwidth for uplink transmissions, and so on. In some instances, the first terminal may command one or more other terminal(s) to set up a satellite link. Alternatively, the other terminals could automatically set up a link or be manually controlled by the user.

In some implementations, the bonded terminals have a protocol to convey capability and status information to each other. This communication can be automated so that set up and management of a bonded connection is automated. A primary terminal may control a secondary terminal using 3rd Generation Partnership Project (3GPP) AT commands, e.g., attention commands used as a prefix to other parameters and instructions in a string or other data format. In addition, Inmarsat extensions can be used, e.g., to communicate available bandwidth from one terminal to another. As noted above, a terminal with bonding software can automatically detect a connection with another terminal and initiate bonded communication automatically based on the detected presence of another terminal. The primary terminal can also dynamically adjust the amount of data it sends to be transmitted by the other terminal based on the available bandwidth and other status information provided by the other terminal.

In some implementations, a user may manually configure terminals so the terminals simply act as bridges for data traffic. In this case, as with the automatic self-configuration scenario, the bonding can be transparent to the data source as well as the receiver and satellite network.

In step (404), the first satellite terminal receives packet data from a data source. For example, the first satellite terminal may receive a data stream, such as a video stream from a video camera, computer, or other data source. The packet data may include various types of packets, such as IP packets, UDP packets, and so on.

In step (406), the first satellite terminal selects subsets of packets from among the packet data. For example, the first satellite terminal selects (i) first packet data for transmission over the first satellite communication link and (ii) second packet data for transmission over the second satellite communication link. This may occur in response to determining that the first satellite terminal is in communication with the second satellite terminal, e.g., discovery of a connection with another terminal that satisfies the requirements for bonding. The first packet data and the second packet data represent different subsets of the packets of the data stream from the data source. For example, the subsets can be disjoint, with the first satellite terminal dividing the packet data into non-overlapping subsets.

For example, the data source may include a video camera that provides a video stream that exceeds the transmission bandwidth of the first satellite communication link but is less than or equal to the combined bandwidth of the first satellite communication link and the second satellite communication link. The first packet data and the second packet data can be selected so that first packets of the video stream are selected as the first packet data and second packets of the video stream are selected as the second packet data. In a similar manner, the data stream may represent data of a high-speed upload of files or other data.

In some implementations, the first satellite terminal assigns or divides the packet data among satellite terminals based on network information. For example, the first satellite terminal can determine a transmission bandwidth of the first satellite communication link of the first satellite terminal, and determine a transmission bandwidth of the second satellite communication link of the second satellite terminal. The first satellite terminal can select the packet data for each terminal based on the transmission bandwidth of the first satellite communication link and the transmission bandwidth of the second communication link. Various measures of bandwidth may be determined and used. For example, the measure may be a maximum bandwidth currently available, a maximum bandwidth of a protocol or hardware system of a terminal, an average bandwidth available over a period of time, a minimum bandwidth that a terminal guarantees to provide, a bandwidth indicated by user input, and so on. The first satellite terminal may obtain the information from the second satellite terminal, for example, by sending a request for network information and receiving the data in response.

In some implementations, the transmission bandwidth of the first satellite communication link is different from the transmission bandwidth of the second satellite communication link. To select the first packet data and the second packet data, the first satellite system can divide the packet data proportionally according to the transmission bandwidth of the first satellite communication link and the transmission bandwidth of the second satellite communication link. In addition, or as an alternative, packet data can be divided among various terminals using other techniques. For example, the packet data may be divided using a current status of the satellite links of the terminals, quality of service measures for the satellite links, signal strengths of the links, and so on.

In step (408), the first satellite terminal transmits the first packet data over the first satellite communication link. In step (410), the first satellite terminal provides the second packet data to the second satellite terminal for transmission over the second satellite communication link. For example, the first satellite terminal routes or forwards the second packet data to the second satellite terminal. In some implementations, the first packet data is transmitted over the first satellite communication link by the first satellite terminal while the second satellite terminal concurrently transmits the second packet data over the second satellite communication link.

In some implementations, return traffic for the data source is received by the first satellite terminal and provided to the data source. The return traffic may include, for example, an acknowledgement or command from a user data receiver. The downlink portion of the second communication link for the second satellite terminal is not used for data transmissions to the data source. The secondary may receive information to be provided to other devices, or for other concurrent data transfers, but the second satellite terminal does not receive data directed to the data source, since that data is all directed to the source through the first satellite terminal.

In some implementations, the first satellite terminal determines a combined bandwidth based on the transmission bandwidth of the first satellite terminal and the second satellite terminal. For example, the first satellite terminal can indicate a sum of the available bandwidth of both the first satellite terminal and the second satellite terminal. The data indicating the combined bandwidth can then be provided to the data source. The first satellite terminal may receive a data stream that the data source generates based on the combined bandwidth information. For example, a video camera can provide a video stream over a direct connection from the video camera to the first satellite terminal. After providing combined bandwidth information, the first satellite terminal can receive a video stream generated with encoding parameters set to use the indicated combined available bandwidth. As part of providing a transparent interface, the primary satellite terminal can providing data indicating that the available bandwidth for transmission by the first satellite terminal exceeds a transmission bandwidth of the first satellite communication link of the first satellite terminal.

In some implementations, the first satellite terminal monitors the first satellite communication link and the second satellite communication link and adjusts the share of packet data allocated to the terminals in response. For example, the first satellite terminal can determine a change in a status of the first satellite communication link or the second satellite communication link. Based on the detected change, the first satellite terminal can change an allocation of packets in the data stream to alter a proportion of the data stream that is provided over the first satellite communication link and the second satellite communication link. Thus the first satellite terminal can dynamically vary the allocation of portions of a data stream among various terminals based on changes in satellite communication link status.

To route the second packet data to the second satellite terminal, the first satellite terminal can alter the packets in the second packet data to generate modified packets that indicate a destination address for the second satellite terminal instead of the first satellite terminal. For example, the first satellite terminal can alter the link layer headers of the packets. The first satellite terminal then transmits the packets with the modified link layer headers to the second satellite terminal. Transport or IP layer packet data, including headers, is not altered.

The first satellite terminal can distribute a data stream among additional satellite terminals also. For example, the first satellite terminal can determine that the first satellite terminal is in communication with one or more additional satellite terminals that each have a respective satellite communication link. In response, the first satellite terminal can select respective additional packet data for transmission over the respective satellite communication links of the one or more additional satellite terminals. The first satellite terminal can then provide the respective additional packet data to the one or more additional satellite terminals, and this additional packet data can be transmitted concurrently with the first packet data and the second packet data.

Embodiments of the invention and all of the functional operations described in this specification may be implemented in digital electronic circuitry, or in computer software, firmware, or hardware, including the structures disclosed in this specification and their structural equivalents, or in combinations of one or more of them. Embodiments of the invention may be implemented, in part, as one or more computer program products, i.e., one or more modules of computer program instructions encoded on a computer-readable medium for execution by, or to control the operation of, data processing apparatus. The computer readable medium may be a non-transitory computer readable storage medium, a machine-readable storage device, a machine-readable storage substrate, a memory device, a composition of matter effecting a machine-readable propagated signal, or a combination of one or more of them. The term "data processing apparatus" encompasses all apparatuses, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) may be written in any form of programming language, including compiled or interpreted languages, and it may be deployed in any form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

While this specification contains many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Thus, particular embodiments of the invention have been described. Other embodiments are within the scope of the following claims. For example, the actions recited in the claims may be performed in a different order and still achieve desirable results.

What is claimed is:

1. A satellite terminal comprising:
   a radio configured to provide a first satellite communication link;
   one or more processors; and
   one or more data storage devices storing instructions that, when executed by the one or more processors, cause the satellite terminal to perform operations comprising:
      determining, by the satellite terminal, that the satellite terminal is in communication with a second satellite terminal that has a second satellite communication link;
      in response to determining that the satellite terminal is in communication with the second satellite terminal that has the second satellite communication link:
         bonding at least an uplink portion of the first satellite communication link with an uplink portion of the second satellite communication link; and
         indicating, to a data source device in communication with the satellite terminal, an available uplink bandwidth that exceeds a transmission bandwidth of the first satellite communication link, wherein the data source device is separate from the satellite terminal and the second satellite terminal;
      receiving, by the satellite terminal, packet data from the data source device;
      in response to determining that the satellite terminal is in communication with the second satellite terminal, selecting, by the satellite terminal and from among the packet data, (i) first packet data for transmission over the first satellite communication link and (ii) second packet data for transmission over the second satellite communication link;
      transmitting, by the satellite terminal, the first packet data over the first satellite communication link; and
      providing, by the satellite terminal, the second packet data to the second satellite terminal for transmission over the second satellite communication link.

2. The satellite terminal of claim 1, wherein transmitting the first packet data over the first satellite communication link by the satellite terminal occurs while the second satellite terminal concurrently transmits the second packet data over the second satellite communication link,
   wherein the satellite terminal is configured to perform bonding with the second satellite terminal in a manner that is transparent to the data source device.

3. The satellite terminal of claim 1, wherein the operations further comprise:
   determining, by the satellite terminal, a transmission bandwidth of the first satellite communication link of the satellite terminal; and
   determining, by the satellite terminal, a transmission bandwidth of the second satellite communication link of the second satellite terminal;
   wherein selecting the first packet data and the second packet data comprises selecting the packet data based on the transmission bandwidth of the first satellite communication link and the transmission bandwidth of the second satellite communication link.

4. The satellite terminal of claim 3, wherein the transmission bandwidth of the first satellite communication link is different from the transmission bandwidth of the second satellite communication link; and
   wherein selecting the first packet data and the second packet data comprises dividing the packet data proportionally according to the transmission bandwidth of the first satellite communication link and the transmission bandwidth of the second satellite communication link.

5. The satellite terminal of claim 3, wherein determining the transmission bandwidth of the second satellite communication link comprises:
   receiving, by the satellite terminal from the second satellite terminal, information indicating a current status of the second satellite communication link between the second satellite terminal and a satellite gateway.

6. The satellite terminal of claim 3, wherein the operations further comprise:
   determining, by the satellite terminal, a combined bandwidth based on the transmission bandwidth of the satellite terminal and the second satellite terminal; and
   providing, by the satellite terminal, data indicating the combined bandwidth to the data source device.

7. The satellite terminal of claim 1, wherein the data source device comprises a video camera providing a video stream that exceeds a transmission bandwidth of the first satellite communication link but is less than or equal to a combined bandwidth of the first satellite communication link and the second satellite communication link, wherein selecting the first packet data and the second packet data comprises selecting first packets of the video stream as the first packet data and selecting second packets of the video stream as the second packet data.

8. The satellite terminal of claim 7, wherein receiving the packet data comprises receiving the second packets of the video stream over a direct connection from the video camera to the satellite terminal; and
wherein providing the second packet data to the second satellite terminal comprises routing, by the satellite terminal, the second packets of the video stream to the second satellite terminal.

9. The satellite terminal of claim 1, wherein the operations further comprise communicating, by the satellite terminal with the data source device, such that return data packets directed to the data source device from a receiver that receives the packet data are routed through the first satellite communication link and not through the second satellite communication link.

10. The satellite terminal of claim 1, wherein receiving the packet data comprises receiving a data stream:
wherein the operations further comprise:
determining a change in a status of the first satellite communication link or the second satellite communication link; and
based on determining the change in the status of the first satellite communication link or the second satellite communication link, changing an allocation of packets in the data stream to alter a proportion of the data stream that is provided over the first satellite communication link and the second satellite communication link.

11. The satellite terminal of claim 1, wherein the operations further comprise:
determining, by the satellite terminal, that the satellite terminal is in communication with one or more additional satellite terminals that each have a respective satellite communication link;
in response to determining that the satellite terminal is in communication with the one or more additional satellite terminals, selecting, by the satellite terminal, respective additional packet data for transmission over the respective satellite communication links of the one or more additional satellite terminals; and
providing, by the satellite terminal, the respective additional packet data to the one or more additional satellite terminals;
wherein transmitting the first packet data over the first satellite communication link by the satellite terminal occurs concurrently with (i) transmission of the second packet data over the second satellite communication link by the second satellite terminal and (ii) transmission of the respective additional packet data over the respective satellite communication links of the one or more additional satellite terminals.

12. The satellite terminal of claim 1, wherein providing the second packet data comprises:
altering, by the satellite terminal, link layer headers of packets in the second packet data to generate packets with modified link layer headers in which an original destination address for the satellite terminal is replaced with a destination address for the second satellite terminal; and
transmitting, by the satellite terminal, the packets with the modified link layer headers to the second satellite terminal.

13. The satellite terminal of claim 1, wherein the operations comprise:
determining a media access control (MAC) address for the second satellite terminal; and
including, in the second packet data, link layer headers indicating the MAC address for the second satellite terminal as a destination address for packets in the second packet data;
wherein providing, by the satellite terminal, the second packet data to the second satellite terminal for transmission over the second satellite communication link comprises providing the second packet data that includes the link layer headers indicating the MAC address for the second satellite terminal as a destination address.

14. A method comprising:
determining, by a first satellite terminal that has a first satellite communication link, that the first satellite terminal is in communication with a second satellite terminal that has a second satellite communication link;
in response to determining that the first satellite terminal is in communication with the second satellite terminal that has the second satellite communication link:
bonding at least an uplink portion of the first satellite communication link with an uplink portion of the second satellite communication link; and
indicating, to a data source device in communication with the satellite terminal, an available uplink bandwidth that exceeds a transmission bandwidth of the first satellite communication link, wherein the data source device is separate from the satellite terminal and the second satellite terminal;
receiving, by the first satellite terminal, packet data from a data source device;
in response to determining that the first satellite terminal is in communication with the second satellite terminal, selecting, by the first satellite terminal and from among the packet data, (i) first packet data for transmission over the first satellite communication link and (ii) second packet data for transmission over the second satellite communication link;
transmitting, by the first satellite terminal, the first packet data over the first satellite communication link; and
providing, by the first satellite terminal, the second packet data to the second satellite terminal for transmission over the second satellite communication link.

15. A system comprising:
a user device that provides packet data;
a first satellite terminal having a first satellite communication link; and
a second satellite terminal having a second satellite communication link separate from the first satellite communication link;
wherein the first satellite terminal is configured to (i) provide, to the user device, a transmission bandwidth of the first satellite communication link and the second satellite communication link as a single communication resource, and (ii) indicate, to the user device an available uplink bandwidth that exceeds a transmission bandwidth of the first satellite communication link; and
wherein the first satellite terminal is configured to receive the packet data from the user device and route the packet data such that the first satellite terminal transmits a first subset of the packet data over the first satellite communication link and the second satellite terminal transmits a second subset of the packet data over the second satellite communication link.

16. The system of claim 15, further comprising one or more additional satellite terminals each having a respective satellite communication link, wherein the first satellite terminal is configured to route one or more additional subsets of the packet data for transmission one or more additional satellite terminals such that a third subset of the packet data is transmitted over the respective satellite communication links currently with transmission of the first subset of the packet data over the first satellite communication link and transmission of the second subset of the packet data over the second satellite communication link.

17. The system of claim 15, wherein the second satellite terminal is configured to provide, to the first satellite terminal, bandwidth data indicating transmission bandwidth available on the second satellite communication link;
   wherein the first satellite terminal is configured to determine, based on the bandwidth data from the second satellite terminal, a combined transmission bandwidth representing transmission bandwidth using both the first satellite communication link and the second satellite communication link; and
   wherein the first satellite terminal is configured to provide data indicating the combined transmission bandwidth to the user device.

18. The system of claim 17, wherein the user device is configured to provide, to the first satellite terminal, packets of a video stream as the packet data;
   wherein the user device is configured to adjust an encoding of the video stream based on the combined transmission bandwidth indicated by the first satellite communication link.

19. The system of claim 18, wherein the first satellite terminal is configured to determine changes in the combined transmission bandwidth and provide data indicating an updated combined transmission bandwidth to the user device while the video stream is being transmitted over the first satellite communication link and the second satellite communication link;
   wherein the user device is configured to dynamically adjust the encoding of the video stream in response to receiving the data indicating the updated combined transmission bandwidth.

20. The system of claim 15, wherein the first satellite terminal is configured to route the packet data proportionally according to an available transmission bandwidth of the first satellite communication link and an available transmission bandwidth of the second satellite communication link.

* * * * *